Patented Nov. 22, 1938

2,137,361

UNITED STATES PATENT OFFICE 2,137,361

PROCESS OF PRODUCING DIFERRIC TETRACHLORIDE MONOSULPHATE

Edgar A. Slagle, North Plainfield, N. J., assignor to Research Corporation, New York, N. Y., a corporation of New York No Drawing. Application December 2, 1935, Serial No. 52,619

5 Claims. (Cl. 23—50)

This invention is concerned with a new chemical compound or composition of matter which is useful as a flocculating agent in the treatment of sewage and the like. The compound may be represented by the formula $Fe_2Cl_4SO_4$ or structurally

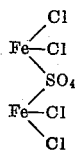

and by the name diferric tetrachloride monosulphate. It may be prepared by reacting ferric sulphate with calcium chloride in the proportion of two moles of calcium chloride to one mole of ferric sulphate. Calcium sulphate is formed as by-product:

$$Fe_2(SO_4)_3 + 2CaCl_2 = Fe_2Cl_4SO_4 + 2CaSO_4$$

In the production of the compound or composition I have found it to be satisfactory to react 1.8 parts by weight of ferric sulphate with 1 part by weight of calcium chloride by mixing the corresponding quantities of $Fe_2(SO_4)_3.9H_2O$ and $CaCl_2.6H_2O$, i. e., 1 part by weight of the hydrated calcium chloride to 1.28 parts by weight of the hydrated ferric sulphate.

The hydrated salts are mixed in finely divided form and the mixture is stirred and reacts with evolution of considerable heat. The resulting pasty mass consists of a mixture of the diferric tetrachloride monosulphate calcium sulphate and free water, the latter derived from the water of crystallization in the hydrated salts. The water of crystallization in the two salts is not objectionable, but it serves to promote the chemical reaction. The anhydrous salts when mixed in finely divided form and stirred, react only very slowly and then apparently only as the reaction is made possible by the absorption of moisture from the atmosphere. The originally white mixture gradually changes to an orange yellow paste. Any water of crystallization in either of the salts or any water added as such to the mixture greatly hastens the reaction. Water as such may be added to a mixture of the hydrated salts, or if desired the salts may be reacted by mixing their aqueous solutions.

The use of the hydrated salts $Fe_2(SO_4)_3.9H_2O$ and $CaCl_2.6H_2O$ is preferred in commercial practice and, as stated, yields a pasty mass. This mass is convenient to handle. It retains its consistency and is readily dispersed in water. It is not corrosive and can be packed and shipped in inexpensive containers made of, e. g. wood or iron. It can be dried and granulated and dissolves much more readily than ferric sulphate. It contains, of course, the calcium sulphate formed by the reaction, but this is not objectionable for most purposes. If desired, the calcium sulphate may be separated by adding sufficient water to the pasty mass to dissolve the diferric tetrachloride monosulphate and filtering or settling the undissolved calcium sulphate. When the diferric tetrachloride monosulphate is prepared by the use of a reaction mixture which contains sufficient water to yield a reaction product in which the diferric tetrachloride monosulphate is dissolved, as when solutions of the salts are reacted, the calcium sulphate may be separated by simply filtering or settling. The calcium sulphate need not however be separated and may even constitute a valuable ingredient of the composition when the composition is used as a flocculating agent in that the fine particles of the calcium sulphate in the liquid under treatment serve as nuclei for the flocculation.

The new compound even in very dilute solutions does not hydrolyze to the formation of basic salts as does ferric sulphate, and it is not corrosive like ferric chloride, but it is comparable to ferric chloride in its flocculating properties. The effectiveness of the composition as a flocculating agent is generally of the same order as that of ferric chloride, but even in case of a substantially inferior effectiveness the new composition is to be preferred on account of its much lower cost and other desirable properties which have been referred to above. It is substantially superior to ferric sulphate as a flocculating agent. In comparing the effectiveness of the new compound with ferric sulphate and ferric chloride I have compared the amounts of solids settled in a given length of time from the same liquid by the addition of equal weights of the respective flocculating agents.

It is interesting to note in this connection that ferric chloride is substantially superior as a flocculating agent to ferric sulphate and that the reaction of one mole of calcium chloride with one mole of ferric sulphate yields a product which is not substantially superior in flocculating properties to ferric sulphate, but the reaction of two moles of calcium chloride with one mole of ferric sulphate in accordance with the present invention yields a product which, as stated above, is comparable in flocculating efficiency with ferric chloride and substantially superior to ferric sulphate. The reaction product of three moles of calcium chloride with one mole of ferric sulphate is not substantially superior as a flocculating agent to the product obtained by the use of two moles of calcium chloride with one mole of ferric sulphate.

Practically therefore my invention resides in the conversion of ferric sulphate into a product which is substantially equal in flocculating properties to the much more expensive and inconvenient ferric chloride by the use of calcium chloride which is very inexpensive. My invention resides further in the discovery that the product obtained by reacting two moles of calcium chloride with one mole of ferric sulphate is markedly superior as a flocculating agent to ferric sulphate and substantially as good as either ferric chloride alone or the product of reaction of three moles of calcium chloride with one mole of ferric sulphate.

In the foregoing I have referred only to the compound or product resulting from the treatment of ferric sulphate with calcium chloride. Similar compounds or compositions can be produced by reacting ferric sulphate with other compounds like calcium chloride which are capable of supplying the chlorine ions necessary for the formation of the diferric tetrachloride monosulphate and of removing the sulphate radical from the ferric sulphate by the formation of an insoluble sulphate. Thus barium chloride and strontium chloride may be substituted for the calcium chloride to the production of the diferric tetrachloride monosulphate and compositions containing this compound, together with the barium or strontium sulphate. As is apparent, mixtures of two or more of such compounds may be used in place of pure calcium chloride.

I claim:
1. As a new compound, a salt having a composition consisting of substantially 112 parts Fe, 142 parts $Cl_2$, 32 parts S, and 64 parts oxygen, corresponding to the theoretical formula,

$$Fe_2Cl_4SO_4.$$

2. A process for the production of a salt having a compositiion corresponding to the theoretical formula $Fe_2Cl_4SO_4$ which comprises reacting sulphate with an alkaline earth metal chloride in substantially the porportions of 1 mole of the ferric sulphate to 2 moles of the alkaline earth metal chloride in the presence of water.

3. Process as defined in claim 2 in which the alkaline earth metal chloride is calcium chloride.

4. Process as defined in claim 2 in which at least a part of the water content of the reaction mixture is supplied in the form of water of hydration of at least one of the reactants.

5. Process as defined in claim 2 in which the reaction is carried out by stirring together finely divided hydrated ferric sulphate and finely divided hydrated alkaline earth metal chloride.

EDGAR A. SLAGLE.

CERTIFICATE OF CORRECTION.

Patent No. 2,137,361.   November 22, 1938.

EDGAR A. SLAGLE.

It is hereby certified that error appears in the printed specification of the above numbered patent requiring correction as follows: Page 2, second column, line 15, claim 2, after the word "reacting" insert ferric; and that the said Letters Patent should be read with this correction therein that the same may conform to the record of the case in the Patent Office.

Signed and sealed this 27th day of December, A. D. 1938.

Henry Van Arsdale (Seal)   Acting Commissioner of Patents.